United States Patent
Lin et al.

(10) Patent No.: US 6,954,647 B2
(45) Date of Patent: Oct. 11, 2005

(54) MOBILITY MANAGEMENT METHOD AND SYSTEM FOR WIRELESS DATA NETWORKS

(75) Inventors: Yi-Bing Lin, Taichung (TW); Shun-Ren Yang, Taichung (TW); Vincent Feng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 346 days.

(21) Appl. No.: 10/330,121

(22) Filed: Dec. 30, 2002

(65) Prior Publication Data

US 2004/0192357 A1 Sep. 30, 2004

(30) Foreign Application Priority Data

Sep. 5, 2002 (TW) ......................................... 91120362 A

(51) Int. Cl.⁷ ................................................. H04Q 7/20
(52) U.S. Cl. .......................... 455/455; 445/445; 445/466
(58) Field of Search .............................. 455/466, 455, 455/426.1, 552.1

(56) References Cited

U.S. PATENT DOCUMENTS 6,104,929 A * 8/2000 Josse et al. ................. 455/445
6,243,579 B1 * 6/2001 Kari .......................... 455/426.1
6,717,928 B1 * 4/2004 Kalliokulju et al. ......... 370/335
2001/0019961 A1 * 9/2001 Nakahara et al. ............ 455/522
2002/0045435 A1 * 4/2002 Fantaske ..................... 455/403
2002/0055367 A1 * 5/2002 Hamabe et al. ............. 455/522
2002/0173308 A1 * 11/2002 Dorenbosch et al. ....... 455/435
2003/0078043 A1 * 4/2003 Horwath et al. ............ 455/436

* cited by examiner

*Primary Examiner*—W. Young
*Assistant Examiner*—Dai Phuong
(74) *Attorney, Agent, or Firm*—Bacon & Thomas, PLLC

(57) ABSTRACT

This invention proposes a mobility management method and system for wireless data networks, such as GPRS and UMTS systems. The wireless data network consists of at least one mobile device and one network apparatus. The cells in a wireless data network are partitioned into several routing areas. In the wireless data network, the mobility management activities for a mobile device are characterized by a mobility management finite state machine exercised in both the mobile device and network apparatus. There are three states in the machine: idle state, standby state and ready state. Both the mobile device and network apparatus employ a ready counter, which counts the number of cells crossed by the mobile device in the packet idle period between two packet transmissions. If the counted number reaches a threshold, the mobility management state switches from the ready state to standby state.

5 Claims, 5 Drawing Sheets

MOBILITY MANAGEMENT METHOD AND SYSTEM FOR WIRELESS DATA NETWORKS

BACKGROUND OF THE INVENTION

1. Field of the Invention

The present invention relates to the technical field of mobility management, and more particularly to a mobility management method and a mobility system for wireless data networks suitable for wireless data networks, such as the General Packet Radio Service (GPRS) system or Universal Mobile Telecommunications System (UMTS).

2. Description of the Related Art

In the current CPRS network, as shown in FIG. 1, the service area is divided into a plurality of routing areas (RAs) 11. Each RA is composed of a plurality of cells 12. Each cell 12 represents the coverage of a base station 13. GPRS network uses a pair of finite states machines executed in both the serving GPRS support node (SGSN) 14 and a mobile phone 15 to perform the mobility management (MM) of the mobile phone 15. The finite state machine has three states: idle state, standby state, and ready state. In the idle state, the GPRS network does not know the existence of the mobile phone 15. In the standby state, the mobile phone 15 has been attached to the GPRS network, and whenever the mobile phone 15 crosses one RA11, it is necessary to register to an associated SGSN14. In the ready state, whenever the mobile phone 15 crosses one cell 12, it is necessary to register to an associated SGSN 14. Besides, the mobile phone 15 must be in ready state for receiving and transmitting packet data units (PDUs).

By switching among the three mobility management states, the GPRS network can perform the mobility management of mobile phone 15. In the ready state, it is predicted that the mobile phone 15 has packet transfer in a short time period. Therefore, each time the mobile phone 15 crosses a cell 12, it must notify the SGSN14 of the new cell address. In this way, the SGSN14 can transfer packets to the new cell 12 directly without paging all cells 12 in the RA11. On the other hand, when one communication session between the mobile phone 15 and the SGSN14 is terminated, it is predicted that the mobile phone 15 will not have packet transfer in a short time period. In this case, the network expense is too high if the registration operation is performed whenever the handset 15 crosses one cell. Thus, the mobility management state switches into the standby state from the ready state. Accordingly, the mobile phone 15 only performs a registration whenever it crosses one RA11. That is, in the ready state, the packet can be sent to the mobile phone 15 directly without extra paging cost. However, the cost of location update is very high since the mobile phone 15 has to perform cell updates. In the standby state, the cost of paging is high since it is necessary to page all cells 12 of the RA11 in which the mobile phone 15 resides. However, the cost of location update is low since the mobile phone 15 only performs RA updates.

As to the above switch from the ready state to the standby state, a ready timer approach is employed in the 23.060 specification of 3 GPP. This approach defines a threshold interval, denoted as T. When a packet is transferred, the ready timer starts to count time reversely through T time units. If the ready timer has completed the counting and the mobile phone 15 has no data transfer, the mobility management state switches from the ready state to the standby state.

With use of the above ready timer approach to switch the mobility management state from the ready state to standby state, if the mobility pattern of the mobile phone 15 and the traffic pattern change frequently, the timing of switch from the ready state to the standby state can not be determined precisely since the ready timer determines the switching time by the fixed threshold interval T. Besides, the ready timer approach will encounter a problem of lose synchronization. For example, when the SGSN 14 has switched to the standby state, the mobile phone 15 is still in the ready state.

In the U.S. Pat. No. 6,243,579, "Controlling Operating States of a Mobile Station in a Packet Radio System", three extra messages are added in the GPRS network to request performing the switch of mobility management states. Such an improvement is aimed at the ready timer. Therefore, the defect of being unable to precisely determine the switching time from the ready state to standby state due to using the fixed threshold interval T still exists. Moreover, the synchronization problem between the mobile phone 15 and SGSN14 can not be avoided.

SUMMARY OF THE INVENTION

Accordingly, the primary object of the present invention is to provide a mobility management method and a mobility management system for wireless data networks to precisely determine the timing that a mobility management state switches from the ready state to the standby state, and effectively resolve the synchronization problem between the mobile phone and SGSN.

To achieve the object, the present invention provides a mobility management method for a wireless data network having a plurality of routing areas. Each routing area has a plurality of cells. The wireless data network performs mobility management by finite state machines in a mobile device and a network apparatus. The finite state machine has a standby state, a ready state and an idle state. Each of the mobile device and the network apparatus has a ready counter. The method determines a timing for switching from the ready state to the standby state for the mobile device and the network apparatus, and comprises the steps of: (A) resetting the ready counters of the mobile device and the network apparatus to have the same threshold K, where K is a non-negative integer; (B) decrementing the ready counter whenever the mobile device crosses one cell; (C) switching the mobile device and network apparatus to the standby state when the ready counter counts to zero; and (D) when the mobile device successfully transfers a packet and the network apparatus successfully receives a packet, resetting the ready counters of the mobile device and network apparatus and switching the mobile device and network apparatus to the ready state.

Moreover, the present invention provides a mobility management system for a wireless data network. The system comprises at least one mobile device, at least one network apparatus, and a plurality of routing areas, each routing area having a plurality of cells. The wireless data network performs mobility management by finite state machines in the mobile device and network apparatus. The finite state machine has a standby state, a ready state and an idle state. When the mobile device and network apparatus are in the ready state, and if the mobile device crosses K cells, where K is a non-negative integer, without transferring any packet, the mobile device and network apparatus switch from the ready state to the standby state.

The various objects and advantages of the present invention will be more readily understood from the following detailed description when read in conjunction with the appended drawings.

BRIEF DESCRIPTION OF THE PREFERRED EMBODIMENTS

Figure 1:
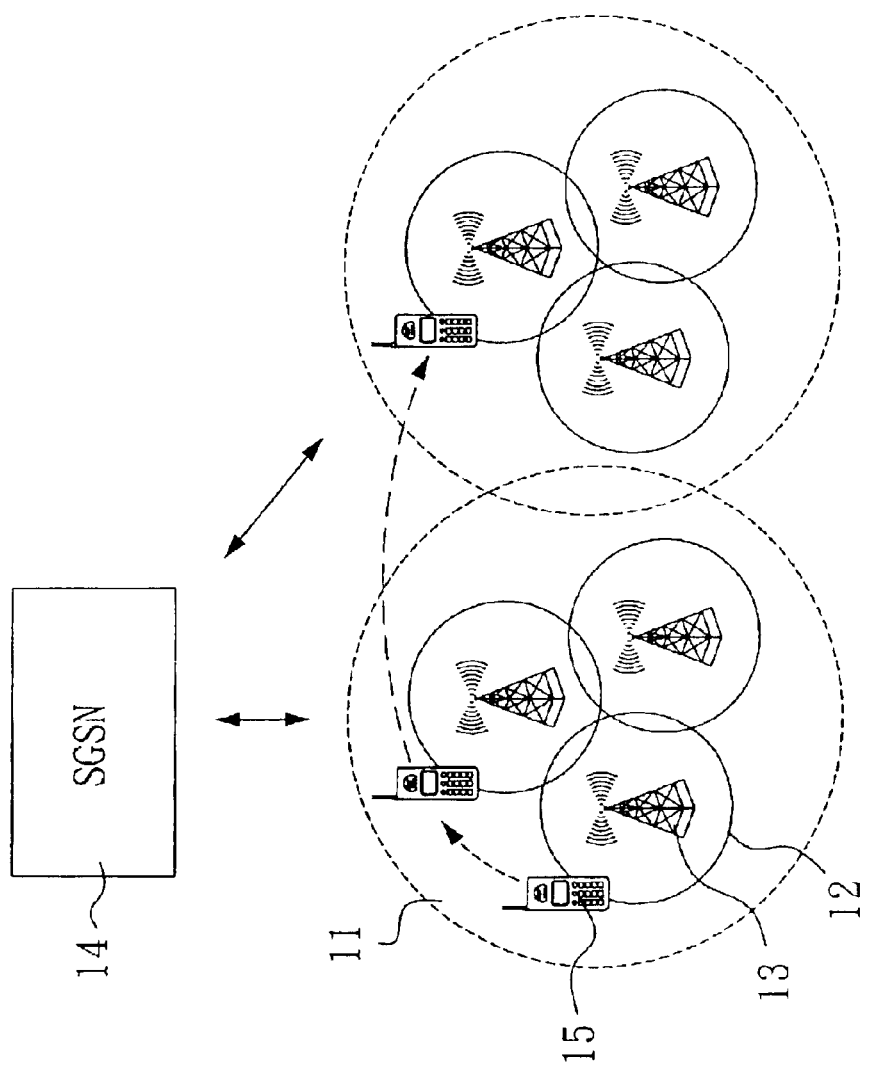
FIG. 1 is a schematic view of the conventional GPRS network.
Figure 2:
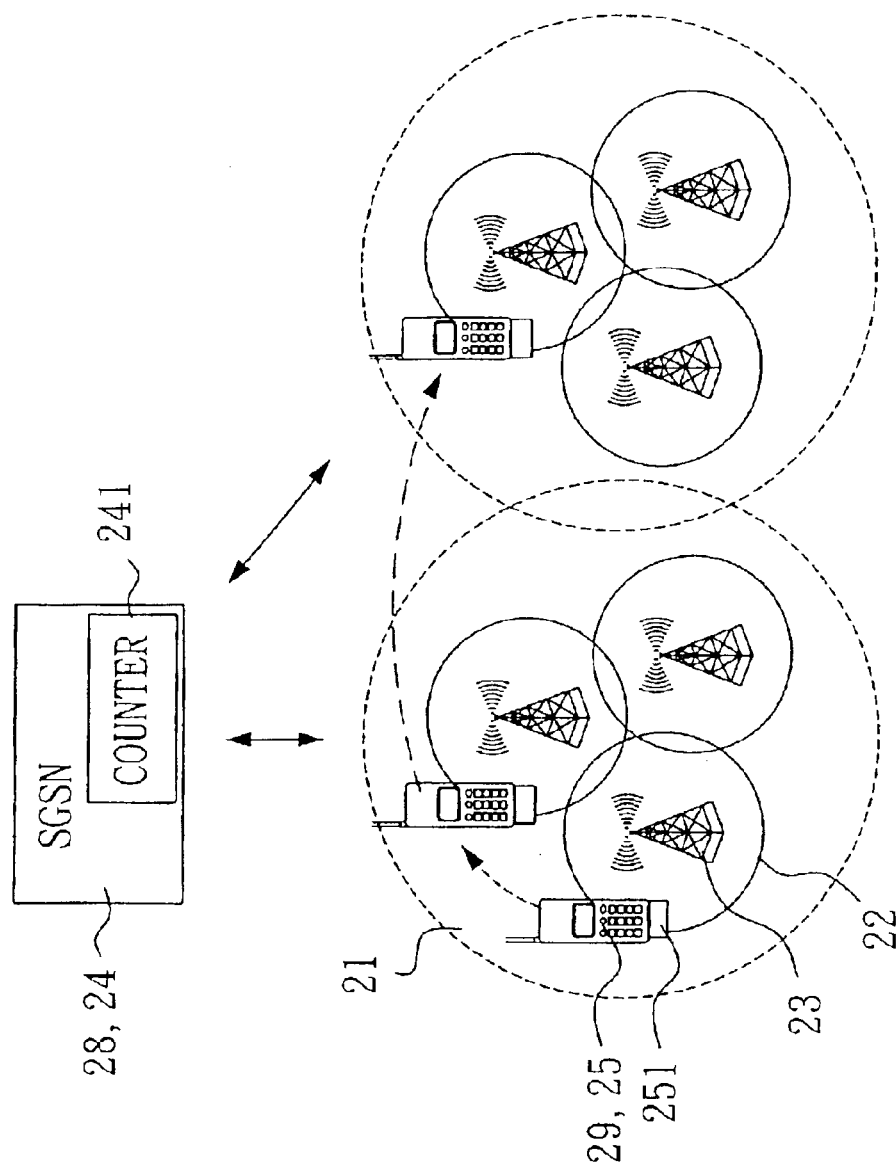
FIG. 2 is a schematic view of the GPRS network in accordance with the present invention.

FIG. 2 shows a wireless data network system for executing the mobility management method of the present invention. In the wireless data system, each of the mobile device 29 and the network apparatus 28 has a ready counter 251, 241 for determining the timing that the mobility management state switches from the ready state to the standby state. Taking a GPRS network as an example, the network apparatus 28 is a SGSN 24 and the mobile device 29 is, for example, a mobile phone 25. The ready counters 251 and 241 are initialized to have the same threshold value K, which can be modified only by the SGSN24. When the SGSN24 wants to modify the threshold value K, the Attach Accept message or Routing Area Update Accept message can be used to achieve the object. If the threshold value K is set to zero, the mobile phone 25 must enter the standby state immediately. If the threshold value K is set as a special value (for example, all binary bits are set as 1), the ready counters 251 and 241 are deactivated; that is, the mobile phone 25 is always at ready state without switching to the standby state.

Figure 3:
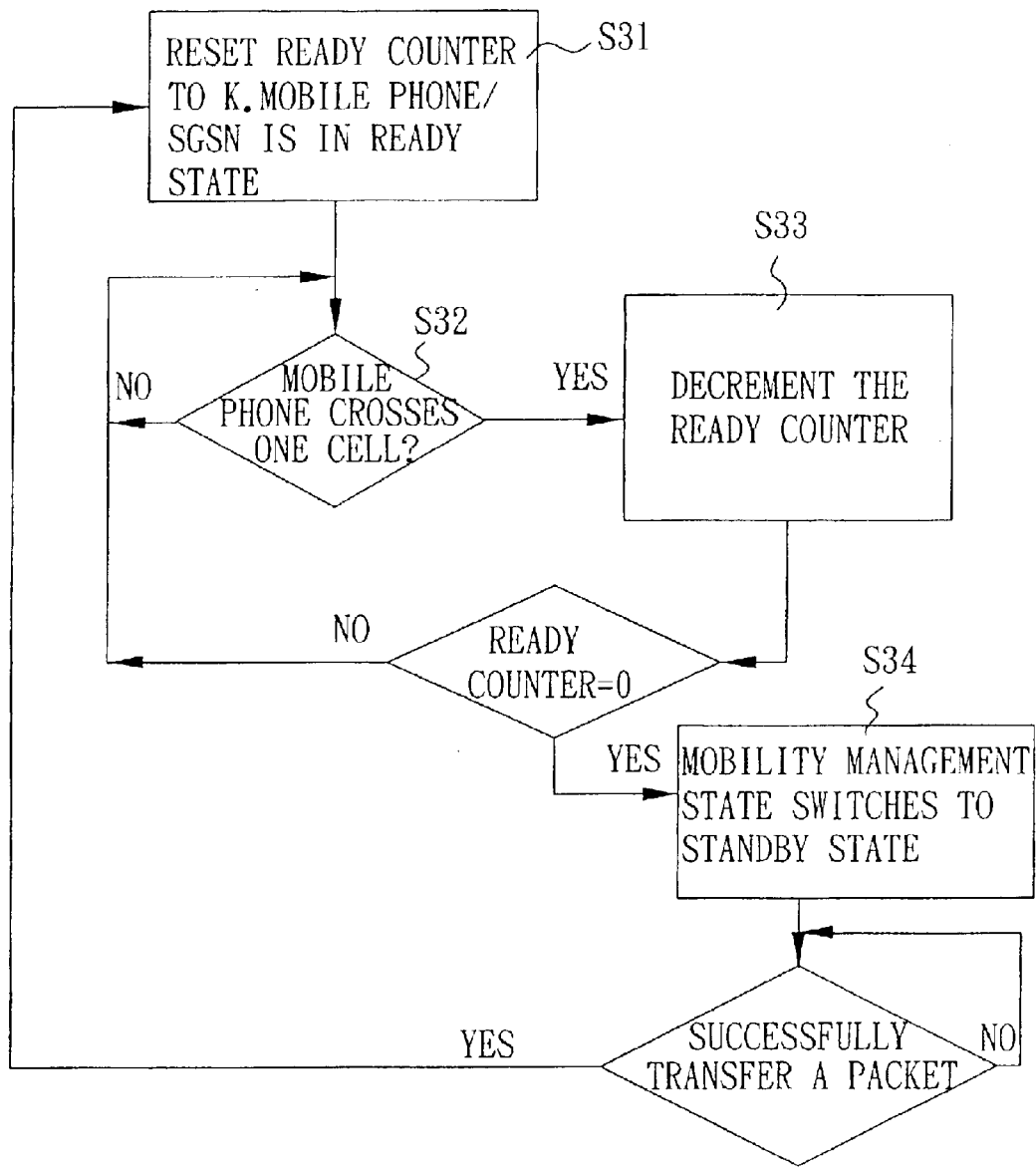
FIG. 3 is a flow chart of the mobility management method for wireless data networks in accordance with the present invention.

FIG. 3 shows a flowchart of the mobility management method for wireless data networks in accordance with the present invention. Initially, the mobility management states of the mobile phone 25 and the SGSN24 are set to the ready state, and the ready counters 251 and 241 of the handset 25 and the SGSN24 are reset as the same threshold value K (step S31). Whenever the mobile phone 25 crosses one cell 22 (step S32), the ready counters 251 and 241 are all decremented (step S33). When the ready counters 251 and 241 count to zeros, the mobility management states of the mobile phone 25 and the SGSN24 switch to the standby states (step S34). When the mobile phone 25 transmits a packet, the ready counter 251 of the mobile phone 25 is reset, so as to restart counting. When the SGSN24 successfully receives a packet, the ready counter 241 of the SGSN24 is reset, so as to restart counting (step S31), and the mobility management states of the mobile phone 25 and the SGSN24 switch from the standby state to the ready state. In this flowchart, the ready counters 251 and 241 of the mobile phone 25 and the SGSN24 have the same value at any time.

With the ready counters 251 and 241 of the mobile phone 25 and the SGSN24, the method of the present invention makes the mobility management state switch from the ready state to the standby state when the mobile phone 25 crosses K cells 22 without any packet transfer. Therefore, the method of the present invention determines the timing of switching the mobility management state based on the number of cells 22 that are crossed by the mobile phone 25. Accordingly, the mobility pattern and traffic pattern of the mobile phone 25 can be captured precisely. Using the ready counter approach described above, even the mobility pattern and traffic pattern of the mobile phone 25 are changed frequently, the timing of switching the mobility management state from the ready state to the standby state can be determined accurately.

Figure 4:
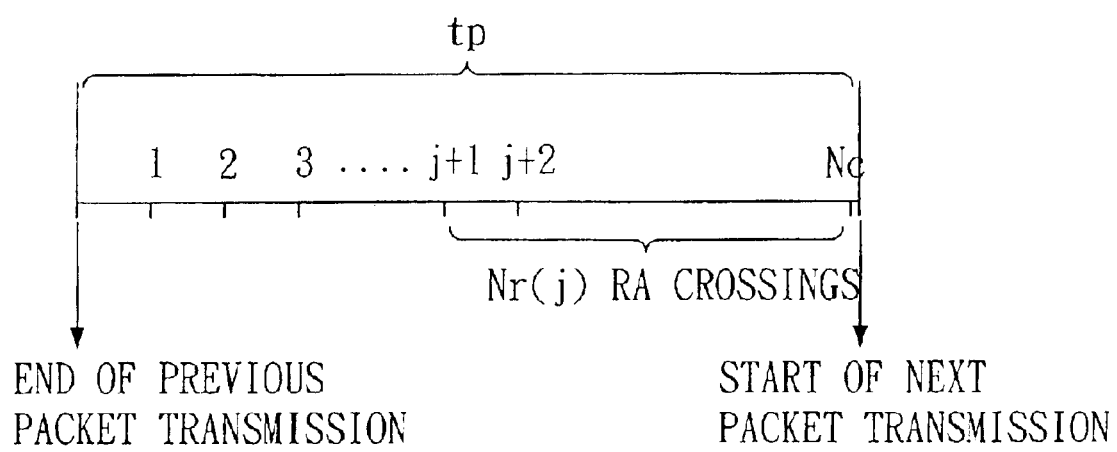
FIG. 4 is a schematic view showing the process for determining an optimal threshold value in accordance with the present invention.

To determine an optimal threshold value $K^*$, referring to FIG. 4, it is assumed to have a packet idle period tp. Nc is defined as the number of cells that are crossed by a mobile phone 25. $Nr(j)$ is the number of RAs crossed between the $(j+1)$-st cell crossing and the Nc-th cell crossing. U represents the cost for performing one cell/RA update. V represents the cost for paging one cell. S represents the number of cells in one RA. The net cost $CT(K)$ of location update and paging in the packet idle period tp with the threshold value K is as follows:

$$CT(K)=U \times Nc, \text{ for } K>Nc$$

$$CT(K)=U \times [K+Nr(K)]+S \times V, \text{ for } K \leq Nc. \quad (1)$$

As above definition, $Nr(K)$ is the number of the RA updates when setting the threshold value K. When $Nc \geq K$, it is obtained:

$$CT(K)=U \times [K+Nr(K)]+S \times V. \quad (2)$$

The number of RA crossing in the previous K cell crossings is $Nr(0)-Nr(K)$.

Therefore, we have:

$$Nr(0)-Nr(K) \leq K. \quad (3)$$

From formulas (2) and (3), we have:

$$CT(K) \geq U \times [Nr(0)]+S \times V=CT(0) \text{ for } K \leq Nc. \quad (4)$$

For $K>Nc$, we have: $CT(K)=CT(Nc+1)$. Therefore, the lowest net cost is $$CT^*=\min 0 \leq K \leq \infty CT(K)=\min 0 \leq K \leq Nc+1 \; CT(K). \quad (5)$$

From formula (4) and (5), we have:

$$CT^*=\min[CT(0), CT(Nc+1)]. \quad (6)$$

Accordingly, the optimal value of the critical value K in a packet idle period tp is determined to be $K^*=0$ or $K^*=Nc+1$.

With the above optimal threshold value $K^*$, there is a minimum net cost (namely, the cost of location update plus the cost of paging) in tp. This optimal threshold value $K^*$ can be adjusted dynamically for satisfying the system requirement. Let $tp(i)$ represent the idle period between the $(i-1)$-st packet transmission and i-th packet transmission, and $K(i)$ represent the optimal K value for the period $tp(i)$. K value can be dynamically adjusted by the following adaptive algorithm:

(1) An initialization is performed by assigning an arbitrary value to $K(0)$, and exercising the mobility management method of ready counter approach by taking $K(0)$ as the threshold value before the first packet arrives.

(2) When i-th packet transmission is completed, the optimal $K(i)$ value that minimizes the net cost for the period $tp(i)$ is computed to be either 0 or $Nc+1$. The mobility management method of the ready counter approach with threshold K is exercised in tp(i+1) period, where:

$$K = \left\lceil \sum_{j=i-M+1}^{i} \frac{K(j)}{M} \right\rceil, \quad \text{for } i \geq M$$

$$K = \left\lceil \sum_{j=1}^{i} \frac{K(j)}{i} \right\rceil, \quad \text{for } i < M.$$

In other words, the threshold value K between the i-th packet transmission and the (i+1)-st packet transmission is selected as the average of the previous M optimal threshold values. By dynamically adjusting the threshold value K, the ready counter approach can capture the mobility pattern and traffic pattern of the mobile phone more precisely, so as to further reduce the location update and paging costs.

In view of the foregoing, it is known that, in comparison with the conventional ready timer approach based on absolute time, the present mobility management method of the ready counter approach is based on the number of crossed cells. If the mobile phone crosses K cells without transferring any packet, the mobility management state switches to the standby state from the ready state. Thus, the switching time of the mobility management state can be precisely determined. In addition, the use of ready counter, instead of the ready timer, can eliminate the lose synchronization problem. Furthermore, by recording the numbers of cells and the numbers of RAs crossed by the mobile phone during the previous M idle periods, it is able to determine the optimal threshold value K*, which is then used as the threshold value during the next idle period to exercise the mobility management method of the present invention. Accordingly, the costs of the location update and paging can be further reduced.

In the above embodiment, the ready counter is initialized as the threshold value K, and then a decrement operation is used to record the number of cells crossed by a mobile phone when no packet is transferred. Similarly, the ready counter can be initialized to zero, and then an increment operation is used to record the number of cells crossed by a mobile phone, so as to achieve the same effect.

To verify the performance of the method according to the present invention, an experiment is performed on the conventional method and the method of the present invention. In the experiment, the following two types of mobility patterns and data traffic patterns are mixes.

Type 1: mean packet idle period=100s, mobility rate $\lambda m'=1/1000s$.

Type 2: mean packet idle period=1000s, mobility rate $\lambda m''=1/10s$.

Figure 5:
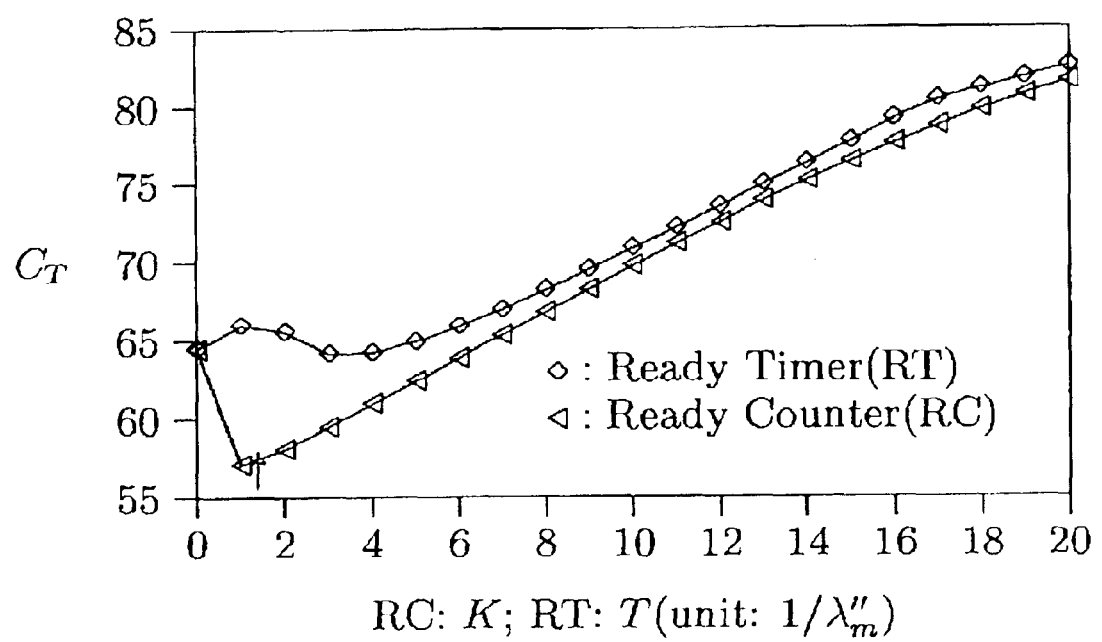
FIG. 5 shows a performance comparison of the present invention and prior art.

In this experiment, 1,000,000 packet idle periods are considered, the former 500,000 packet idle periods use the type 1 pattern and the latter 500,000 packet idle periods use the type 2 pattern. Let CT' represent the expected cost for one packet idle period of type 1 pattern (the cost of location update plus the cost of paging), and CT'' represent the expected cost for one packet idle period of the type 2 pattern. With the method of the present invention, K is set as 1 to obtain the lowest expected cost CT', and K is set as zero to obtain the lowest expected cost CT''. Therefore, a K with a value of 1 provides an excellent effect for both type 1 and 2 patterns. While in the conventional method, when T>100s, the lowest expected cost CT' is obtained, and on the other hand, when T<10s, the lowest expected cost CT'' is obtained. From the above analysis, it is known that the type 1 and 2 patterns cannot be satisfied at the same time no matter how the T value is set. Referring to FIG. 5, from the experiment result, it is shown that the expected cost CT in the conventional method using a ready timer is higher than the expected cost CT in the method of the present invention.

The present invention is thus described. It will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A mobility management method for a wireless data network having a plurality of routing areas, each routing area having a plurality of cells, the wireless data network performing mobility management by finite state machines in a mobile device and a network apparatus, the finite state machine having a standby state, a ready state and an idle state, each of the mobile device and the network apparatus having a ready counter, the method determining a timing for switching from the ready state to the standby state for the mobile device and the network apparatus, and comprising the steps of:

(A) resetting the ready counters of the mobile device and the network apparatus to have the same threshold K, where K is a non-negative integer, wherein the threshold K in a packet idle period has an optimal value of 0 or Nc+1, where Nc is a number of cells crossed by the mobile device in the packet idle period, the packet idle period is a time interval between two adjacent packet transmissions, and the threshold K between two packet transmissions is an average of multiple previous optimal threshold values;

(B) decrementing the ready counter whenever the mobile device crosses one cell;

(C) switching the mobile device and network apparatus to the standby state when the ready counter counts to zero; and (D) when the mobile device successfully transfers a packet and the network apparatus successfully receives a packet, resetting the ready counters of the mobile device and network apparatus and switching the mobile device and network apparatus to the ready state.

2. The mobility management method of claim 1, wherein the wireless data network is a packet wireless service system (GPRS) network, and the network apparatus is a serving GPRS support node (SGSN).

3. A mobility management system for a wireless data network comprising at least one mobile device, at least one network apparatus, and a plurality of routing areas, each routing area having a plurality of cells, the wireless data network performing mobility management by finite state machines in the mobile device and network apparatus, each of the mobile device and network apparatus having a ready counter for counting the number of cells crossed by the mobile device, the finite state machine having a standby state, a ready state and an idle state, wherein when the mobile device and network apparatus are in the ready state, and if the mobile device crosses K cells, where K is a non-negative integer, without transferring any packet, the mobile device and network apparatus switch from the ready state to the standby state, and wherein K has an optimal value of 0 or Nc+1, where Nc is a number of cells crossed by the mobile device in a packet idle period, the racket idle period is a time interval between two adjacent packet transmissions, and the K value between two packet transmissions is an average of multiple previous optimal K values.

4. The mobility management system of claim 3, wherein when the mobile device and network apparatus are in the standby state and if the mobile device successfully transfers a packet and the network apparatus successfully receives a packet, the mobile device and network apparatus switch to the ready state.

5. The mobility management system of claim 3, wherein the wireless data network is a packet wireless service system (GPRS) network, and the network end device is a serving GPRS support node (SGSN).

* * * * *